United States Patent
Yurman et al.

(10) Patent No.: US 10,932,594 B2
(45) Date of Patent: Mar. 2, 2021

(54) RING DISPLAY FIXTURE

(71) Applicant: David Yurman IP LLC, New York, NY (US)

(72) Inventors: David M. Yurman, New York, NY (US); Peter Roth, Holmes, NY (US)

(73) Assignee: David Yurman IP LLC, New York, NY (US)

( * ) Notice: Subject to any disclaimer, the term of this patent is extended or adjusted under 35 U.S.C. 154(b) by 0 days.

(21) Appl. No.: 16/246,883

(22) Filed: Jan. 14, 2019

(65) Prior Publication Data

US 2019/0216238 A1    Jul. 18, 2019

Related U.S. Application Data

(60) Provisional application No. 62/617,445, filed on Jan. 15, 2018, provisional application No. 62/632,975, filed on Feb. 20, 2018.

(51) Int. Cl.
*A47F 7/02* (2006.01)
*A47F 3/14* (2006.01)
*A45C 11/16* (2006.01)
*F16B 2/12* (2006.01)

(52) U.S. Cl.
CPC ............. *A47F 7/02* (2013.01); *A45C 11/16* (2013.01); *A47F 3/14* (2013.01); *F16B 2/12* (2013.01)

(58) Field of Classification Search
CPC .. A47F 7/02; A47F 7/021; A47F 7/022; A47F 7/024; A47F 2005/165; A47F 5/16; A47F 3/14; A45C 11/16; F16B 2/12; F16B 2/185; F16B 2/18; Y10T 24/44581; Y10T 24/44726; Y10T 24/44735; Y10T 24/44684; Y10T 24/44692; Y10T 24/44709; Y10T 24/4459; B25C 1/02; B25C 3/006; A44C 17/04; A44C 17/043; G04D 3/042; G04D 3/045; B25B 3/00; B25B 1/02; B25B 1/04; B25B 5/02; F16M 13/00; F16M 13/02; F16M 11/041
USPC ............. 211/85.2; 248/509, 505, 500, 316.4, 248/176.1, 229.12, 229.14, 229.22, 248/229.24, 228.3, 228.5, 230.3, 230.5, 248/231.41, 231.61, 316.6; 269/254 R, 269/228, 143, 249, 71, 6, 3; 81/44, 7, 81/7.5, 8; 24/600.7, 523; 297/82.23
See application file for complete search history.

(56) References Cited

U.S. PATENT DOCUMENTS 142,575 A * 9/1873 Martin et al. ........ B65D 5/5021
  206/560
329,018 A * 10/1885 Coffin .................. B65D 5/5021
  206/565

(Continued)

OTHER PUBLICATIONS

International Search Report and Written Opinion of Application No. PCT/US2019/013463 dated Mar. 15, 2019.

*Primary Examiner* — Ingrid M Weinhold
(74) *Attorney, Agent, or Firm* — Gordon & Jacobson, P.C.

(57) ABSTRACT

A jewelry display apparatus includes a body having a lower base and an upper display portion. The apparatus also includes a clamp coupled to the body. The clamp is configured to retain the jewelry in a fixed position relative to the body. The clamp has at least one portion movable relative to the body and is configured for selective movement between a closed position and an open position.

16 Claims, 8 Drawing Sheets

(56) References Cited

U.S. PATENT DOCUMENTS

| | | | | |
|---|---|---|---|---|
| 427,300 A * | 5/1890 | Carroll | ............... | B25B 5/102 269/146 |
| 672,561 A * | 4/1901 | Loeb | ............... | A47F 7/024 206/560 |
| 679,257 A * | 7/1901 | Ford | ............... | B25B 5/068 269/6 |
| 702,853 A * | 6/1902 | Angell | ............... | A47F 7/024 206/560 |
| 703,713 A * | 7/1902 | Smith et al. | ............... | F16F 3/04 267/70 |
| 886,608 A * | 5/1908 | Jersennann | ............... | A47F 7/02 206/565 |
| 914,563 A * | 3/1909 | Fowler | ............... | B65D 73/0064 206/349 |
| 989,571 A * | 4/1911 | Dahl | ............... | A47F 7/024 206/560 |
| 1,114,998 A | 10/1914 | Love | | |
| 1,245,819 A * | 11/1917 | Taylor | ............... | A47B 23/042 248/453 |
| 1,516,489 A * | 11/1924 | Barton | ............... | B60R 9/00 24/523 |
| 1,758,873 A * | 5/1930 | Wickes | ............... | A47G 29/093 248/509 |
| 2,312,425 A * | 3/1943 | Le Piane | ............... | B25B 7/12 81/356 |
| 2,319,377 A * | 5/1943 | Wallace | ............... | B25B 5/02 24/523 |
| 2,466,909 A * | 4/1949 | Periman | ............... | B25B 5/067 24/456 |
| 2,618,303 A * | 11/1952 | Ferguson | ............... | B25B 5/102 269/170 |
| 2,682,694 A | 6/1954 | Kempkes | | |
| 2,805,035 A * | 9/1957 | Coombs | ............... | B65F 1/141 248/508 |
| 3,022,067 A * | 2/1962 | Stolz | ............... | G04D 1/02 269/107 |
| 3,148,909 A | 9/1964 | Tantlinger | | |
| 3,289,853 A * | 12/1966 | Eichhorn | ............... | A47F 7/02 211/85.2 |
| 3,326,254 A * | 6/1967 | Diehl | ............... | B25C 3/008 81/44 |
| 3,559,935 A * | 2/1971 | Gardner | ............... | A47G 1/12 248/125.8 |
| 3,668,681 A * | 6/1972 | Kaplan | ............... | G08B 13/1454 340/537 |
| 3,789,895 A * | 2/1974 | Levinson | ............... | B25C 3/008 81/44 |
| 3,863,307 A * | 2/1975 | Leonardo | ............... | F16B 2/065 24/535 |
| 3,964,603 A * | 6/1976 | Sandler | ............... | A47F 7/024 206/560 |
| 4,300,674 A * | 11/1981 | Davet | ............... | A47F 7/024 206/1.5 |
| 4,511,041 A * | 4/1985 | Waitzman | ............... | E05B 73/00 206/560 |
| 4,580,769 A * | 4/1986 | Pappas | ............... | B25B 5/02 269/100 |
| 4,632,351 A * | 12/1986 | Coon | ............... | A47G 29/08 206/566 |
| 4,646,920 A * | 3/1987 | Kruger | ............... | G09F 3/18 206/459.5 |
| 4,931,058 A * | 6/1990 | Cooper | ............... | A61B 17/1227 24/523 |
| 5,156,430 A * | 10/1992 | Mori | ............... | B66C 1/36 24/600.6 |
| 5,430,914 A * | 7/1995 | Patterson | ............... | F16B 45/02 24/598.5 |
| 5,535,878 A * | 7/1996 | Reed | ............... | A47F 7/02 206/303 |
| D379,410 S * | 5/1997 | Porcaro | ............... | D6/682.3 |
| 5,867,877 A * | 2/1999 | Patterson | ............... | F16G 11/101 24/517 |
| 5,954,321 A * | 9/1999 | Spero | ............... | B25B 5/10 269/254 CS |
| 6,229,564 B1 * | 5/2001 | High | ............... | G03B 15/00 348/94 |
| 6,401,312 B1 * | 6/2002 | Wang | ............... | F16B 45/02 24/265 H |
| 6,654,990 B2 * | 12/2003 | Liu | ............... | F16B 45/025 24/598.5 |
| 6,892,994 B1 * | 5/2005 | Renshaw | ............... | F16M 11/041 248/154 |
| 7,055,681 B2 * | 6/2006 | Herzog | ............... | A47F 7/02 206/566 |
| 7,284,304 B2 | 10/2007 | Fenton et al. | | |
| 7,303,067 B2 * | 12/2007 | Herzog | ............... | A47F 7/02 206/566 |
| 8,292,097 B2 * | 10/2012 | Goldberg | ............... | A47F 7/024 206/560 |
| 8,529,583 B1 * | 9/2013 | Golden | ............... | A61B 17/076 606/138 |
| 9,414,695 B2 | 8/2016 | Steber et al. | | |
| 9,573,266 B2 * | 2/2017 | Huang | ............... | F16M 13/04 |
| D782,853 S * | 4/2017 | Foster | ............... | D6/682.3 |
| 9,713,366 B2 * | 7/2017 | Olson | ............... | A44C 27/00 |
| 9,739,297 B1 * | 8/2017 | Coghan, IV | ............... | F16B 2/12 |
| 9,897,252 B2 * | 2/2018 | Brzezicki | ............... | F16M 13/022 |
| 2005/0269216 A1 * | 12/2005 | Ovadia | ............... | A45C 11/16 206/6.1 |
| 2015/0351504 A1 * | 12/2015 | Olson | ............... | A44C 27/00 269/9 |

\* cited by examiner

RING DISPLAY FIXTURE

CROSS-REFERENCE TO RELATED APPLICATIONS

This application claims priority to U.S. Provisional Application 62/617,445, filed Jan. 15, 2018, and to U.S. Provisional Application 62/632,975, filed Feb. 20, 2018, the entire contents of both of which are incorporated by reference herein in their entireties.

BACKGROUND

1. Field

The present disclosure relates to jewelry display devices and methods.

2. State of the Art

Jewelry is often displayed on a form that approximates the part of the body to which the jewelry is adapted. For example, necklaces are often shown banded about a rounded velvet form that is shaped like a neck of an intended wearer. Also, rings are often displayed on stands with tapered or cylindrical form approximating a wearer's hand and the ring is slid over the form as it would be on a finger.

SUMMARY

According to one aspect, further details of which are described below, a jewelry display apparatus includes a body having a lower base and an upper display portion. The apparatus also includes a clamp coupled to the body. The clamp is configured to retain the jewelry in a fixed position relative to the body. The clamp has at least one portion movable relative to the body and is configured for selective movement between a closed position and an open position.

In one embodiment, the base is configured to be mounted to a support structure. In one embodiment, the base is configured to be received in a receptacle in the structure.

In one embodiment, the body defines a longitudinal channel extending through the base and the upper display portion, and the at least one moveable portion of the clamp extends at least partially in the longitudinal channel and is configured for relative translation with the body in the longitudinal channel. In one embodiment, the at least one movable portion is a hook having a bent portion extending above the display portion of the body and having an elongated portion extending in the longitudinal channel. The apparatus may further include a first grip secured to an upper surface of the display portion, and a second grip secured to the bent portion of the hook. The first and second grips have oppositely facing surfaces configured to grip the jewelry disposed therebetween. The apparatus may include a resilient biasing member, such as a spring, between the hook and the body. The resilient biasing member is configured to urge the first and second grips toward one another.

The apparatus may also include a lever pivotally coupled to the body and having a first end engaged with the hook and having a second end extending from the body. The second end is configured to be depressed by a user to pivot the lever relative to the body to cause the first end of the lever to urge the elongated portion of the hook to translate in the first channel away from the resilient biasing member and move the first and second grips away from one another.

DETAILED DESCRIPTION OF THE PREFERRED EMBODIMENTS

Figure 1A:
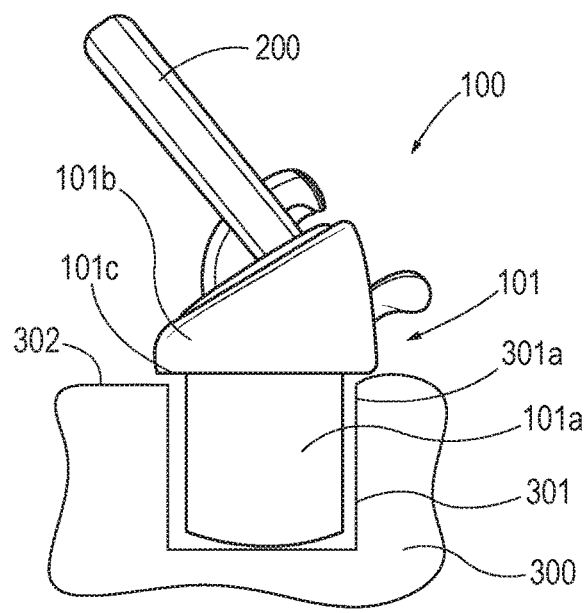
FIG. 1A shows a right side view of an embodiment of a jewelry display apparatus displaying a piece of jewelry in accordance with an aspect of the disclosure. Also shown in FIG. 1A is a structure in which the jewelry display apparatus is mounted.
Figure 1B:
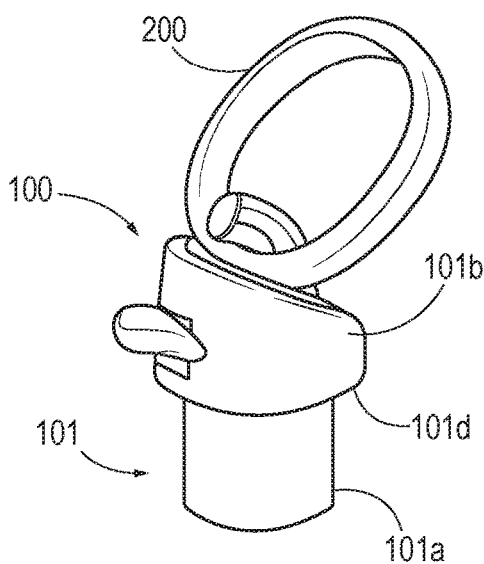
FIG. 1B shows an isometric view, from a top and left side, of the jewelry display apparatus and piece of jewelry shown in FIG. 1A.
Figure 1C:
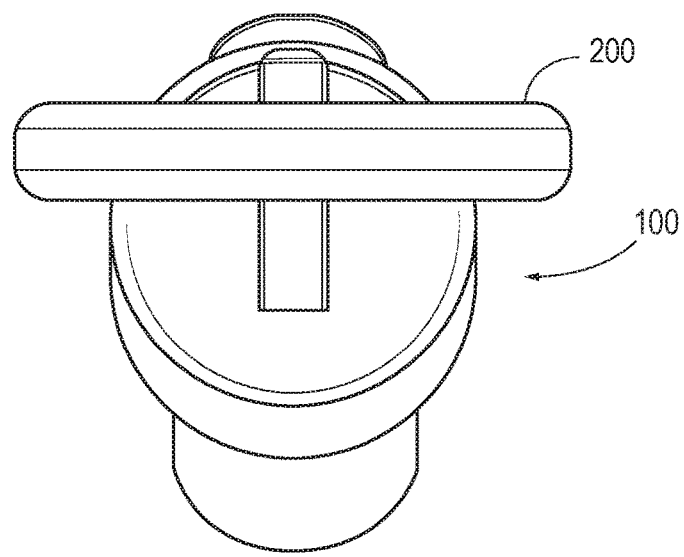
FIG. 1C shows an isometric view, from a top and front side, of the jewelry display apparatus and piece of jewelry shown in FIG. 1A.
Figure 2A:
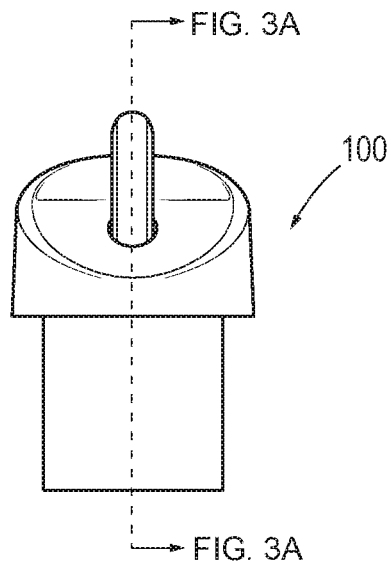
FIG. 2A shows a front view of the jewelry display apparatus of FIGS. 1A to 1C without the piece of jewelry.
Figure 2B:
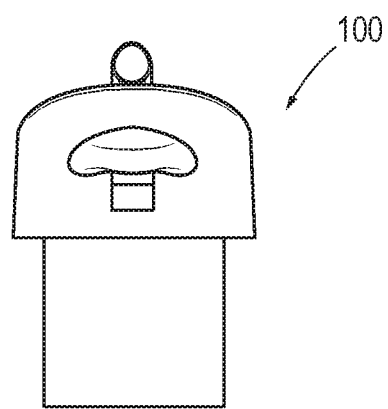
FIG. 2B shows a rear view of the jewelry display apparatus of FIG. 2A.
Figure 2C:
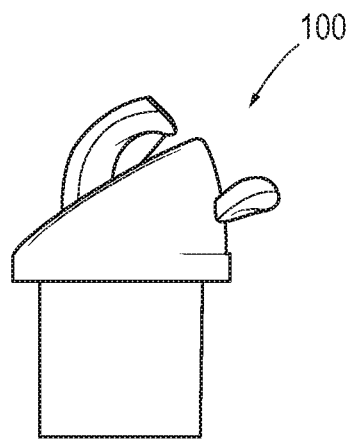
FIG. 2C shows a right side view of the jewelry display apparatus of FIG. 2A.
Figure 2D:
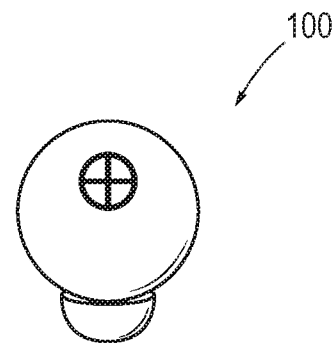
FIG. 2D shows a bottom view of the jewelry display apparatus of FIG. 2A.

FIGS. 1A to 1C show an embodiment of a jewelry display fixture or apparatus 100 displaying a piece of jewelry 200 (a ring is shown) in accordance with an aspect of the disclosure. The fixture 100 includes a body 101 having a lower base 101a and an upper display portion 101b. The lower base 101a is configured to mount to a receptacle 301 of another structure 300 to support the body 101, e.g., in an upright orientation. The receptacle 301 may define a hole 301a or other opening having a shape corresponding to the outer shape and dimensions of the base 101a so that the receptacle 301 can receive the base 101a like a plug is received into a socket. The receptacle 301 and the base 101a may be configured to mate together so that the fixture 100 will not fall out of the receptacle 301, e.g., such as if the fixture is mounted upside down in the receptacle 301. In one embodiment, the receptacle 301 and the base 101a are configured with a friction fit. In one embodiment, the receptacle 301 and the base 101a are configured to mate together with a spring mechanism that keeps the fixture 100 from falling out of the receptacle 301. The other structure 300 may be made of various materials, such as rocks, mineral, gemstone, precious metal, plastic, glass, etc. Also, the other structure 300 may have various shapes, including cylinders, hearts, cubes, pyramids, etc.

A shoulder 101c is formed in an outer surface 101d of the body 101. The shoulder 101c separates the lower base 101a from the upper display portion 101b. In one embodiment, the aforementioned receptacle 301 has a depth sufficient to receive the base 101a so that the shoulder 101c is adjacent or abuts an upper rim 302 of the receptacle when the base 101a is fully inserted into the receptacle, as shown in FIG. 1A.

The fixture 100 includes a jewelry securing arrangement (e.g., a clamp), described in greater detail below, which is configured to removably secure the piece of jewelry 200 to the fixture 100 for display in a fixed position relative to the fixture 100. The fixture 100 in FIGS. 1A to 1C is shown in FIGS. 2A to 2D with the piece of jewelry 200 removed. An example of a jewelry securing arrangement is shown, for example, in detail with reference to FIGS. 3A to 4C, described below.

Figure 3A:
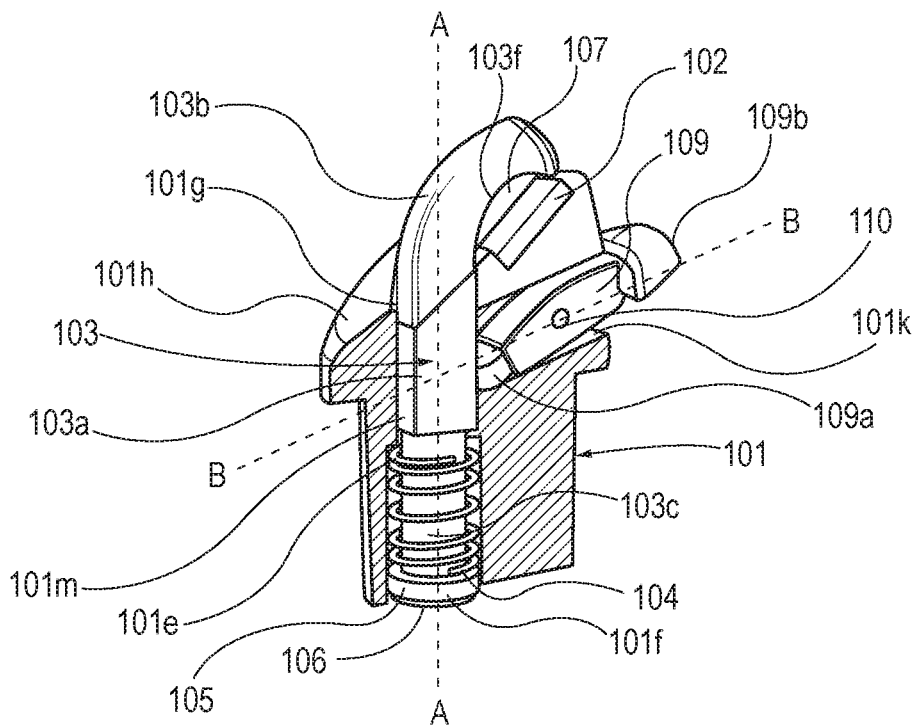
FIG. 3A shows the jewelry display apparatus of FIGS. 2A to 2C along section FIG. 3A-FIG. 3A in FIG. 2A.
Figure 3B:
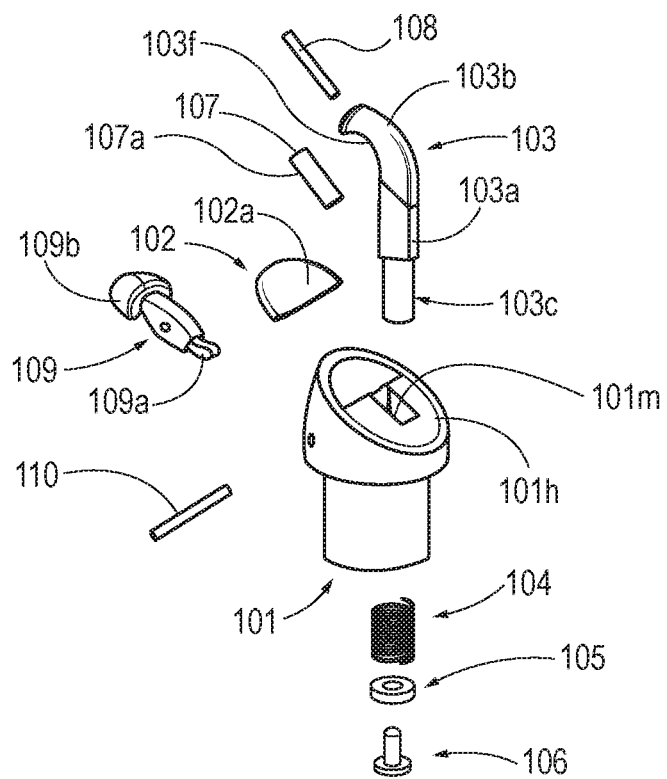
FIG. 3B is an exploded assembly view of the jewelry display apparatus in FIGS. 2A to 2C.

As shown in FIG. 3A, the body 101 defines a first channel 101m, which is a longitudinal passageway through the body 101. The passageway 101m extends along a central longitudinal axis A-A from a lower end 101f thereof to an upper end 101g thereof. The passageway 101m has an annular spring seat 101e formed therein at an intermediate longitudinal position between the lower end 101f and the upper end 101g.

The upper display portion 101b of the body 101 has an upper surface 101h that extends generally at an acute angle with respect to the longitudinal axis A-A (FIG. 3A), although this angular arrangement is not required. A first grip 102 is seated on or in the upper surface 101h of the upper portion 101b of the body 101. The first grip 102 may be formed of silicone rubber or other materials that have a non-slip surface that will not scratch jewelry.

A hook 103, having an elongated portion 103a and a bent portion 103b, is at least partially received in the passageway 101m. Specifically, the elongated portion 103a of the hook 103 extends in the passageway 101m while the bent portion 103b extends outside of the passageway 101m above the upper surface 101h. As used herein, "bent" denotes a deviation from the elongated portion 103a, and is not limited to any particular shape. Thus, while the bent portion 103b is shown with a curvature, such curvature is not required.

Figure 4A:
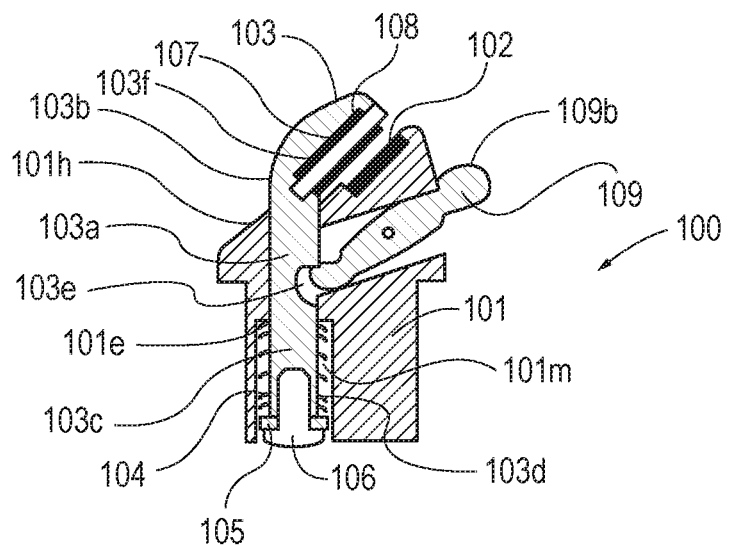
FIG. 4A shows the jewelry display apparatus in a closed position.

Also, as shown more clearly in FIG. 4A, the elongated portion 103a of the hook 103 defines a notch 103e located above the spring seat 101e. A resilient biasing member, shown as a coil spring 104, surrounds a lower segment 103c of the elongated portion 103a of the hook 103 in the passageway 101m and is seated against the spring seat 101e. A washer 105 is secured to a lower end 103d of the lower segment 103c of the elongated portion 103a of the hook 103 with a screw 106, thereby retaining the spring 104 between the spring seat 101e and the washer 105 about the lower portion 103c of the elongated portion 103a of the hook 103. The spring 104 is configured to bias the hook 103 in the downward direction and urge the first grip 102 towards a second grip 107, described in greater detail below.

An underside of the bent portion 103b of the hook 103, facing the upper surface 101h, defines a notch 103f configured to receive a second grip 107. The second grip 107 may be formed of the same materials as the first grip 102, e.g., silicone rubber. A pin 108 (FIGS. 3B, 4A) secures the second grip 107 to the bent portion 103b of the hook 103, as shown in greater detail in FIG. 4A. The first grip 102 has a surface 102a (FIG. 3B) that oppositely faces a surface 107a of the second grip 107, and the opposing surfaces 102a and 107a (FIG. 3B) extend parallel to one another. In the example embodiment, the first grip 102 and the second grip 107 extend at an acute angle with a central longitudinal axis A-A. The first grip 102 and the second grip 107 function like jaws of a clamp that are configured to contact and apply clamping force to the article of jewelry 200 to fix the article of jewelry to the fixture 100 for display, as shown in FIGS. 1A to 1C.

As shown in FIG. 3A, the body 101 defines a second channel 101k having an axis B-B that is not parallel with the longitudinal axis A-A. The second channel 101k communicates with and intersects the first channel 101m. Specifically, the axis B-B may extend at an angle between 45 and 135 degrees of axis A-A. A lever 109 is partially disposed in the second channel 101k and is pivotally connected to the body 101 with a pin 110 so that the lever 109 can pivot inside the second channel 101k about the pin 110.

The lever 109 has an inner end (inner being towards the longitudinal axis A-A) 109a and an outer end 109b. The outer end 109b of the lever 109 extends radially outward from the side surface of the body 101 and is formed as a handle or toggle that is accessible for a user to depress, e.g., with a finger. The inner end 109a of the lever 109 is engaged with the notch 103e in the elongated portion 103a of the hook 103, as shown most clearly in FIG. 4A. The lever 109 permits the user to raise the hook 103 by depressing the outer end 109b of the lever 109. Raising the hook 103 relative to the body 101 displaces the second grip 107 away from the first grip 107, which can permit a user to position an article of jewelry therebetween or to release an article of jewelry held between the grips 102 and 107.

For example, as shown in FIG. 4A, the first grip 102 and the second grip 107 are relatively positioned at a closed or resting position. It will be appreciated that in the embodiment shown in FIG. 4A, the first grip 102 and the second grip 107 are spaced from one another and are not in direct contact with one another. However, in another embodiment, the grips 102, 107 may contact one another in the resting position.

Figure 4B:
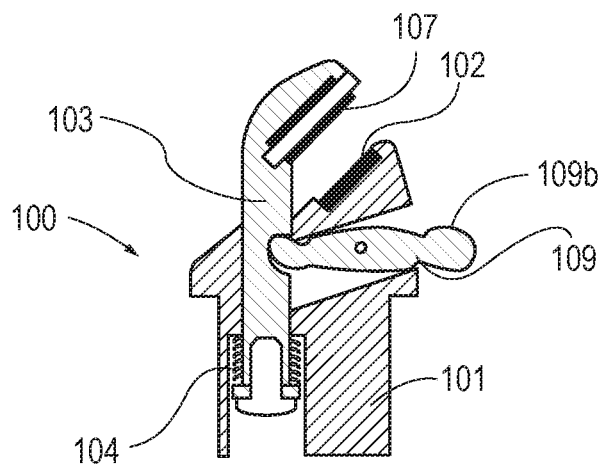
FIG. 4B shows the jewelry display apparatus in an open position.
Figure 4C:
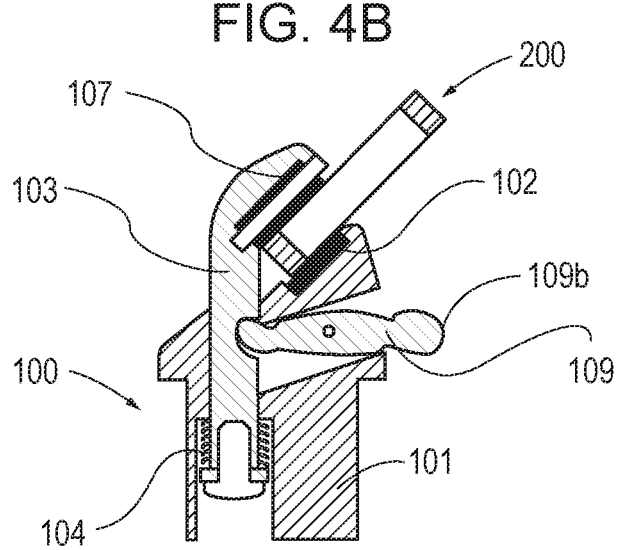
FIG. 4C shows the jewelry display apparatus in a clamped position securing jewelry for display.

At FIG. 4B, a user depresses the outer end 109b of the lever 109 to raise the inner end 109a of the lever 109, which causes the hook 103 relative to the body 101, thereby compressing the spring 104 and increasing the spacing between the grips 102, 107 sufficiently for the user to introduce an article of jewelry between the first and second grips. Then, at FIG. 4C, a user can introduce the article of jewelry 200 between the grips 102, 107, and thereafter release the outer end 109b of the lever 109 to permit the compressive spring force on the spring 104 to urge the hook 103 downward in the first channel 101m and causing the second grip 107 to move towards the jewelry 200 and the first grip 102 until the jewelry 200 is compressed between the grips 102 and 107, whereupon the hook 103 stops moving relative to the body 101. The compressive force 104 caused by the spring 104 acting on the hook 103 is transferred to the grips 102 and 107 to securely clamp the jewelry 200 between the grips and fix the jewelry 200 in a position relative to the body 101 for display. The spring 104 and the hook 103 permits the hook 103 to travel along a continuous path along the axis A-A and the hook 103 is not limited to move at specific indexed locations along axis A-A. This permits the fixture to fix jewelry with varying dimensions between the grips 102, 107. It will be appreciated, however, that the maximum dimension between the grips 102 and 107 is limited by the vertical travel distance of the hook 103 in the first channel 101m, which is limited by the length of the spring 104 in its fully compressed state, as shown, for example, in FIG. 4B.

FIGS. 5A to 8C show another embodiment of a ring display fixture 400 displaying a piece of jewelry 200 (FIGS. 5A, 5B, 5C, 8C) (a ring is shown) in accordance with an aspect of the disclosure. The fixture 400 includes a body 401 having a lower base 401a and an upper display portion 401b. The lower base 401a is configured to mount to a receptacle 301 of another structure 300 to support the body 401, e.g., in an upright orientation. The receptacle 301 may define a hole 301a or other opening having a shape corresponding to the outer shape and dimensions of the base 401a so that the receptacle 301 can receive the base 401a like a plug is received into a socket. The receptacle 301 and the base 401a may be configured to mate together so that the fixture 400 will not fall out of the receptacle 301, e.g., such as if the fixture is mounted upside down in the receptacle 301. In one embodiment, the receptacle 301 and the base 401a are configured with a friction fit. In one embodiment, the receptacle 301 and the base 401a are configured to mate together with a spring mechanism that keeps the fixture 400 from falling out of the receptacle 301. The other structure 300 may be made of various materials, such as rocks, mineral, gemstone, precious metal, plastic, glass, etc. Also, the other structure 300 may have various shapes, including cylinders, hearts, cubes, pyramids, etc.

Figure 5A:
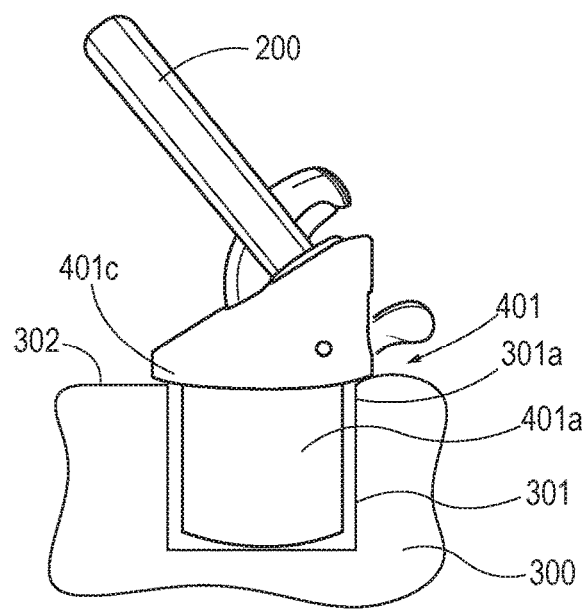
FIG. 5A shows a right side view of another embodiment of a jewelry display apparatus displaying a piece of jewelry in accordance with an aspect of the disclosure. Also shown in FIG. 5A is a structure in which the jewelry display apparatus is mounted.

A shoulder 401c is formed in an outer surface 401d of the body 401. The shoulder 401c separates the lower base 401a from the upper display portion 401b. In one embodiment, the aforementioned receptacle 301 has a depth sufficient to receive the base 401a so that the shoulder 401c is adjacent or abuts an upper rim 302 of the receptacle when the base 401a is fully inserted into the receptacle 301, as shown in FIG. 5A.

Figure 5B:
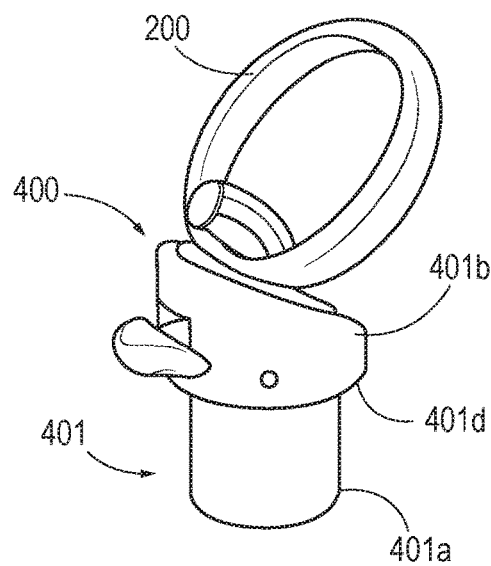
FIG. 5B shows an isometric view, from a top and left side, of the jewelry display apparatus and piece of jewelry shown in FIG. 5A.
Figure 5C:
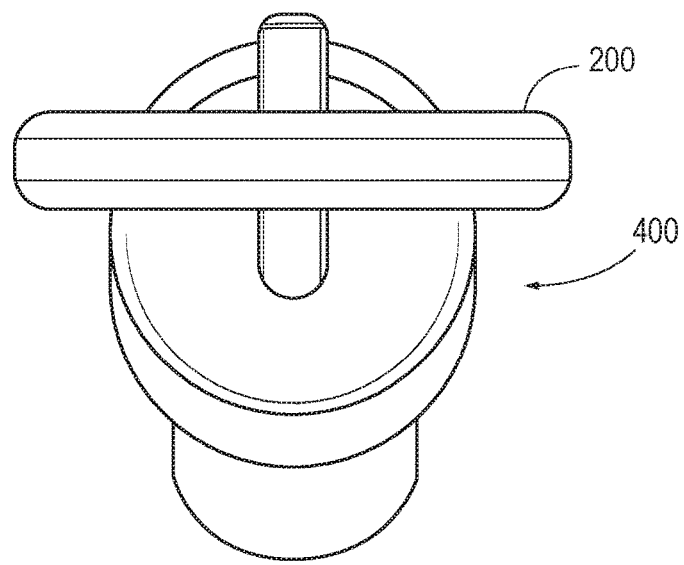
FIG. 5C shows an isometric view, from a top and front side, of the jewelry display apparatus and piece of jewelry shown in FIG. 5A.

The fixture 400 includes a jewelry securing arrangement (e.g., a clamp), described in greater detail below, which is configured to removably secure the piece of jewelry 200 to the fixture 400 for display in a fixed position relative to the fixture 400. The fixture 400 in FIGS. 5A to 5C is shown in FIGS. 6A to 6D with the piece of jewelry 200 removed. An example of a jewelry securing arrangement is shown, for example, in detail with reference to FIGS. 7A to 8C, described below.

Figure 7A:
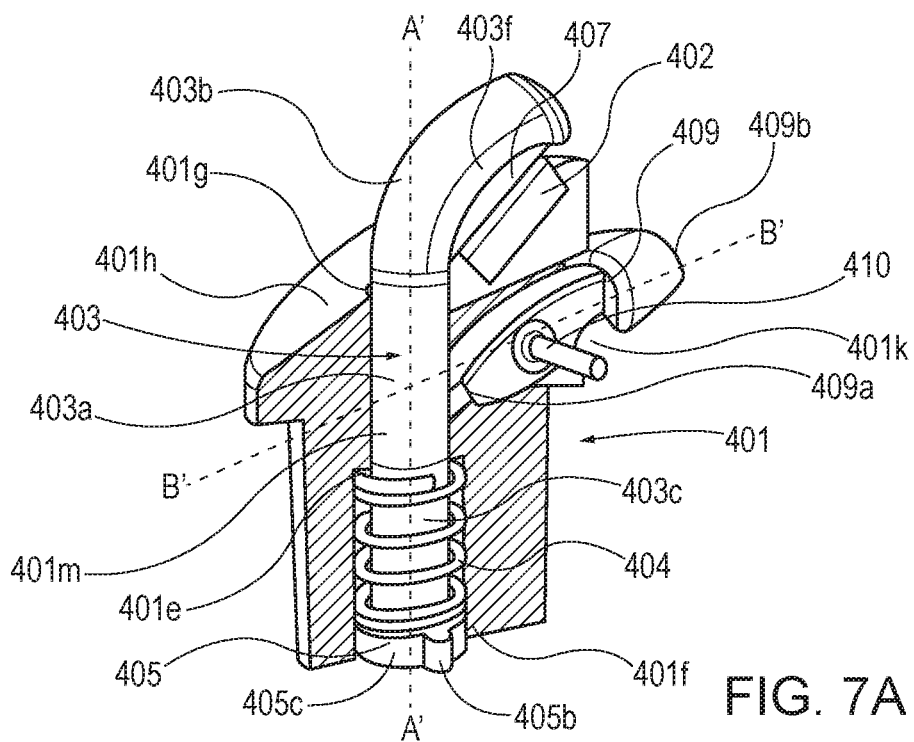
FIG. 7A shows the jewelry display apparatus of FIGS. 6A to 6C along section FIG. 7A-FIG. 7A in FIG. 6A.

As shown in FIG. 7A, the body 401 defines a first channel 401m, which is a longitudinal passageway through the body 401. The passageway 401m extends along a central longitudinal axis A'-A' from a lower end 401f thereof to an upper end 401g thereof. The passageway 401m has an annular spring seat 401e formed therein at an intermediate longitudinal position between the lower end 401f and the upper end 401g.

The upper display portion 401b of the body 401 has an upper surface 401h that extends generally at an acute angle with respect to the longitudinal axis A'-A', although this angular arrangement is not required. A first grip 402 is seated on or in the upper surface 401h of the upper portion 401b of the body 401. The first grip 402 may be formed of silicone rubber or other materials that have a non-slip surface that will not scratch jewelry.

A hook 403, having an elongated portion 403a and a bent portion 403b, is at least partially received in the passageway 401m. Specifically, the elongated portion 403a of the hook 403 extends in the passageway 401m while the bent portion 403b extends outside of the passageway 401m above the upper surface 401h. As used herein, "bent" denotes a deviation from the elongated portion 403a, and is not limited to any particular shape. Thus, while the bent portion 403b is shown with a curvature, such curvature is not required.

Figure 8A:
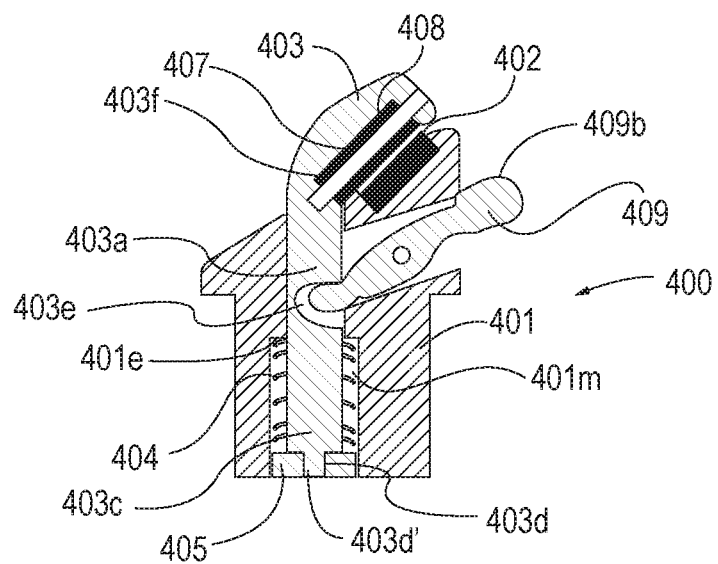
FIG. 8A shows the jewelry display apparatus in a closed position.

Also, as shown more clearly in FIG. 8A, the elongated portion 403a of the hook 403 defines a notch 403e located above the spring seat 401e. A coil spring 404 surrounds a lower segment 403c of the elongated portion 403a of the hook 403 in the passageway 401m and is seated against the spring seat 401e. A washer 405 is secured to a lower end 403d of the lower segment 403c of the hook 403, thereby retaining the spring 404 between the spring seat 401e and the washer 405 about the lower segment 403c of the elongated portion 403a of the hook 403. The spring 404 is configured to bias the hook 403 in the downward direction.

Figure 6A:
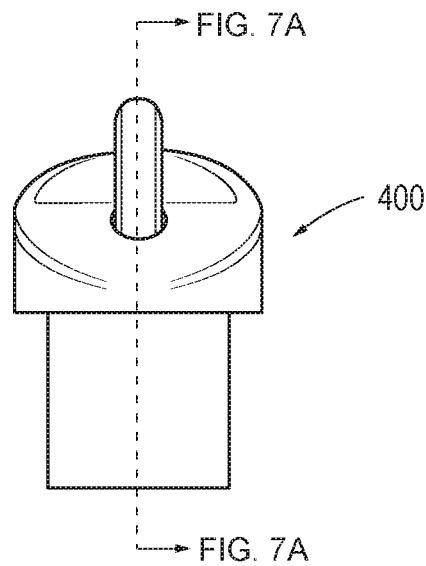
FIG. 6A shows a front view of the jewelry display apparatus of FIGS. 5A to 5C without the piece of jewelry.
Figure 6B:
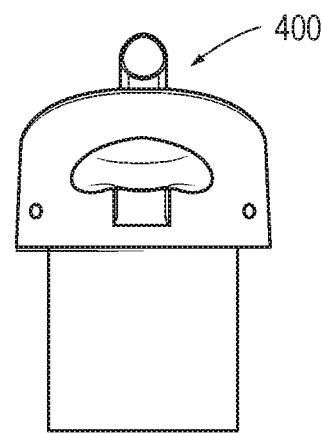
FIG. 6B shows a rear view of the jewelry display apparatus of FIG. 6A.
Figure 6C:
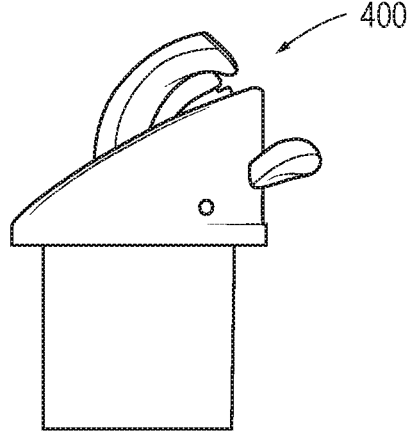
FIG. 6C shows a right side view of the jewelry display apparatus of FIG. 6A.
Figure 6D:
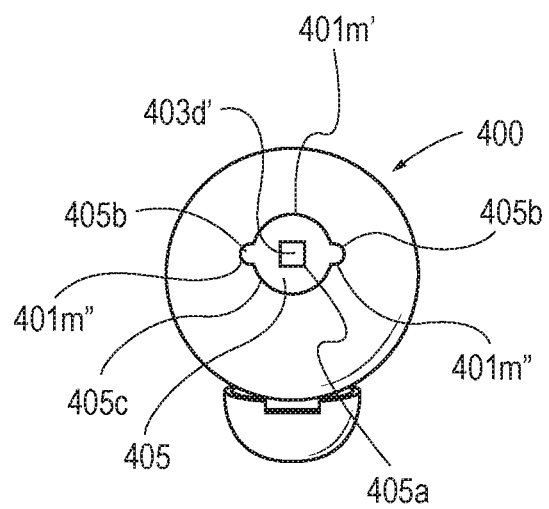
FIG. 6D shows a bottom view of the jewelry display apparatus of FIG. 6A.
Figure 7B:
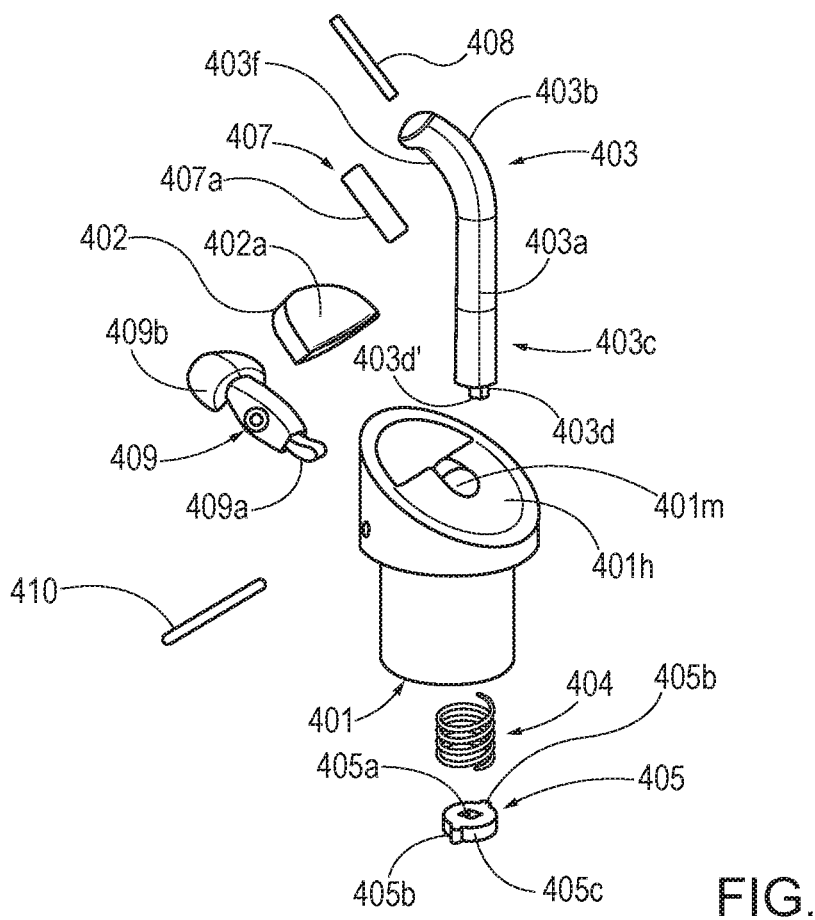
FIG. 7B is an exploded assembly view of the jewelry display apparatus in FIGS. 6A to 6C.

In the embodiment shown in FIGS. 6D, 7B, and 8A the washer 405 defines a central opening 405a that is configured to receive a protrusion 403d' extending downwardly from the lower end 403d of the lower segment 403c of the elongated portion 403a of the hook 403. In the embodiment shown in FIGS. 6D and 7B, the opening 405a and the protrusion 403d' have complementary a square shapes, however, other shapes are possible including, without limitation, round, triangular, star, diamond, hexagon, and octagon. The mating of protrusion 403d' and the central opening 405a may, thus, form a keyed connection which can prevent relative rotation between the washer 405 and the hook 403. In one embodiment, the protrusion 403d' connects to opening 405a with a snap fit connection. Other connection types are possible to connect and retain the washer 405 to the lower end 403d. For example, the washer 405 may be glued or otherwise fused to the lower end 403d. Alternatively, in one embodiment, the protrusion 403d' may be threaded with male threads and the central opening 405a may have female threads configured to engage and mate with the male threads of the protrusion 403d'.

As shown most clearly in FIGS. 6D, 7A, and 7B, the washer 405 has a generally circular central region defined by an outer circular sidewall or periphery 405c, but has two diametrically opposed circular projections or ears 405b extending outwardly from the outer circular sidewall or periphery 405c of the washer 405. Although two ears 405b are shown in this embodiment, in other embodiments, the washer 405 may have fewer ears (i.e., only one), or more ears (i.e., 3 or more). Also, in embodiments where the washer 405 has a plurality of ears 405b, it is not required that they are disposed or extend diametrically opposite one another.

In order for the washer 405 to slide vertically in a lower portion 401m' of the channel 401m below the spring seat 401e, the lower portion 401m' of the channel 401m has a cross sectional geometry that mates to and is complementary to the shape of the washer 405. Thus, the lower portion 401m' of the channel 401m is defined by two diametrically opposed grooves 401m" (FIG. 6D) have a cross sectional shape (e.g., circular) (viewed along a cross section perpendicular to axis A'-A') that complements the cross sectional shape of the projections or ears 405b. In view of the ears 405b and the retained connection between the washer 405 and the lower end 403d of the lower segment 403c, it will be appreciated that the washer 405 is "keyed" in the lower portion 401m' of the channel 401m such that the washer 405 cannot rotate about axis A'-A' within the lower portion 401m' of the channel 401m and the washer 405 cannot rotate relative to the lower segment 403c. Thus, in at least one embodiment, the hook 403 cannot rotate about axis A'-A'.

An underside of the bent portion 403b of the hook 403, facing the upper surface 401h, defines a notch 403f configured to receive a second grip 407. The second grip 407 may be formed of the same materials as the first grip 402, e.g., silicone rubber. A pin 408 (FIG. 3A) secures the second grip 407 to the bent portion 403b of the hook 403, as shown in greater detail in FIG. 8A. The first grip 402 has a surface 402a (FIG. 7B) that oppositely faces a surface 407a of the second grip 407, and the opposing surfaces 402a and 407a (FIG. 7B) extend parallel to one another. The first grip 402 and the second grip 407 function like jaws of a clamp that are configured to contact and apply clamping force to the article of jewelry 200 to fix the article of jewelry to the fixture 400 for display, as shown in FIGS. 5A to 5C.

As shown in FIG. 7A, the body 401 defines a second channel 401k having an axis B'-B' that is not parallel with the longitudinal axis A'-A'. The second channel 401k communicates with and intersects the first channel 401m. Specifically, the axis B'-B' may extend at an angle between 45 and 135 degrees of axis A'-A'. A lever 409 is partially disposed in the second channel 401k and is pivotally connected to the body 401 with a pin 410 so that the lever 409 can pivot inside the second channel 401k about the pin 410.

The lever 409 has an inner end (inner being towards the longitudinal axis A'-A') 409a and an outer end 409b. The outer end 409b of the lever 409 extends radially outward from the side surface 401d of the body 401 and is formed as a handle or toggle that is accessible for a user to depress, e.g., with a finger. The inner end 409a of the lever 409 is engaged with the notch 403e in the elongated portion 403a of the hook 403, as shown most clearly in FIG. 8A. The lever 409 permits the user to raise the hook 403 by depressing the outer end 409a of the lever 409. Raising the hook 403 relative to the body 401 displaces the second grip 407 away from the first grip 407, which can permit a user to position an article of jewelry therebetween or to release an article of jewelry held between the grips 402 and 407.

For example, as shown in FIG. 8A, the first grip 402 and the second grip 407 are relatively positioned at a closed or resting position. It will be appreciated that in the embodiment shown in FIG. 8A, the first grip 402 and the second grip 407 are spaced from one another and are not in direct contact with one another. However, in another embodiment, the grips 402, 407 may contact one another in the resting position.

Figure 8B:
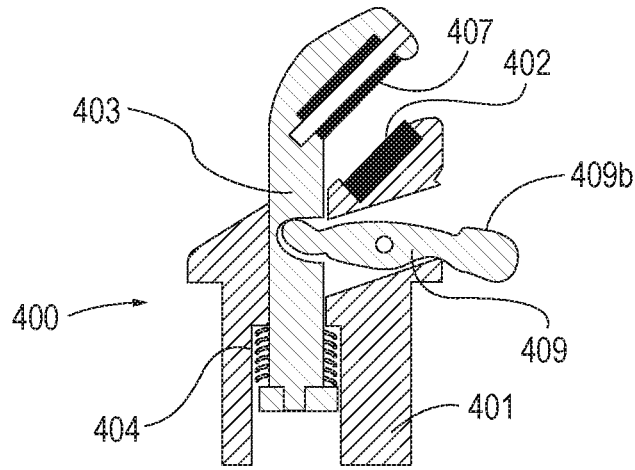
FIG. 8B shows the jewelry display apparatus in an open position.
Figure 8C:
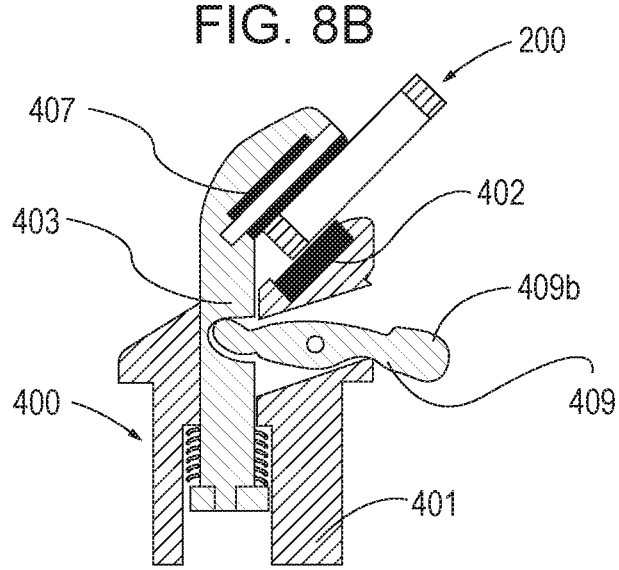
FIG. 8C shows the jewelry display apparatus in a clamped position securing jewelry for display.

At FIG. 8B, a user depresses the outer end 409b of the lever 409 to raise the inner end 409a of the lever 409, which causes the hook 403 relative to the body 401, thereby compressing the spring 404 and increasing the spacing between the grips 402, 407 sufficiently for the user to introduce an article of jewelry between the first and second grips. Then, at FIG. 8C, a user can introduce the article of jewelry 200 between the grips 402, 407, and thereafter release the outer end 409b of the lever 409 to permit the compressive spring force on the spring 404 to urge the hook 403 downward in the first channel 401m and causing the second grip 407 to move towards the jewelry 200 and the first grip 402 until the jewelry 200 is compressed between the grips 402 and 407, whereupon the hook 403 stops moving relative to the body 401. The compressive force caused by the spring 404 acting on the hook 403 is transferred to the grips 402 and 407 to securely clamp the jewelry 200 between the grips 402 and 407 and fix the jewelry 200 in a position relative to the body 401 for display. The spring 404 and the hook 403 permits the hook 403 to travel along a continuous path along the axis A'-A' and the hook 403 is not limited to move at specific indexed locations along axis A'-A'. This permits the fixture 400 to fix jewelry with varying dimensions between the grips 402, 407. It will be appreciated, however, that the maximum dimension between the grips 402 and 407 is limited by the vertical travel distance of the hook 403 in the first channel 401m, which is limited by the length of the spring 404 in its fully compressed state, as shown, for example, in FIG. 8B.

There have been described and illustrated herein several embodiments of a jewelry display apparatus and a method of using the apparatus. While particular embodiments of the invention have been described, it is not intended that the invention be limited thereto, as it is intended that the invention be as broad in scope as the art will allow and that the specification be read likewise. Thus, while particular materials have been disclosed, it will be appreciated that other suitable materials may be used as well. In addition, while a particular type of resilient or biasing member, such as a coil spring, has been disclosed, it will be understood that other suitable resilient or biasing members can be used. For example, and not by way of limitation, a rubber bellows, annular compressible foam or rubber element. Also, in the clamp the hook can be stationary and the lower portion of the clamp can be displaced open against a bias to receive the piece of jewelry and then released to clamp it therein. Also, while the embodiments of the jewelry display apparatus described above include a lever to open and close the clamp, it will be appreciated that the lever may be omitted entirely so that a user can directly translate one portion of the clamp relative to another, for example, by pulling on the bent portion of the hook. It will therefore be appreciated by those skilled in the art that yet other modifications could be made to the provided invention without deviating from its spirit and scope as claimed.

What is claimed is:

1. A display apparatus for a piece of jewelry, comprising:
   a body having a lower base and an upper display portion, wherein the body defines a longitudinal channel extending through the lower base and the upper display portion;
   a clamp coupled to the body, the clamp being configured to retain the jewelry in a fixed position relative to the body, the clamp having at least one portion movable relative to the body and configured for selective movement between a closed position and an open position, the at least one portion resiliently biased into the closed position, wherein the at least one movable portion is a hook having a bent portion extending above the upper display portion of the body and having an elongated portion that extends in the longitudinal channel and that is configured for translation within the longitudinal channel of the body;

a washer secured to an end of the elongated portion of the hook, wherein the washer and the longitudinal channel are configured to permit relative translation therebetween without relative rotation; and a lever pivotally connected to the body and having a first end engaged with the hook and having a second end extending from the body, the second end configured to be depressed by a user to pivot the lever to cause the first end of the lever to translate the hook to open the clamp.

2. The apparatus of claim 1, wherein:
the lower base is configured to be mounted to a support structure.

3. The apparatus of claim 1, further comprising:
a first grip secured to an upper surface of the upper display portion; and
a second grip secured to the bent portion of the hook, the first and second grips having respective first and second grip surfaces that are oppositely facing and parallel, the first and second grip surfaces configured to grip the jewelry disposed therebetween.

4. The apparatus of claim 3, wherein:
the first grip surface and the second grip surface extend at an acute angle with respect to a central longitudinal axis of the longitudinal channel.

5. The apparatus of claim 3, further comprising:
a resilient biasing member between the hook and the body, the resilient biasing member configured to urge the first and second grips toward one another.

6. The apparatus according to claim 1, wherein:
the longitudinal channel is a first channel that extends along a first axis, and
wherein the body defines a second channel that extends along a second axis that is not parallel with the first axis, and
wherein the second channel communicates with and intersects the first channel, and
wherein the lever is partially disposed in the first channel and the second channel, and
wherein the second channel and the lever are configured to permit the lever to pivot with the body inside the second channel.

7. The apparatus according to claim 6, wherein:
the elongated portion of the hook defines a notch engaged with the first end of the lever.

8. A display system for a piece of jewelry, comprising:
a display apparatus according to claim 1; and
a receptacle for receiving the lower base and supporting the body.

9. The system of claim 8, wherein:
the body defines a shoulder formed in an outer surface of the body that separates the lower base from the upper display portion.

10. The system of claim 9, wherein:
the receptacle has a depth sufficient to receive the lower base so that the shoulder is adjacent or abuts an upper rim of the receptacle when the lower base is fully inserted into the receptacle.

11. The system of claim 8, wherein:
the receptacle and the lower base are configured to securely connect to one another.

12. The system of claim 11, wherein:
the receptacle and the lower base connect by a friction fit.

13. The system of claim 11, wherein:
the receptacle is formed of rock, mineral, gemstone, metal, plastic, or glass.

14. A display apparatus for a piece of jewelry, comprising:
a body having a lower base and an upper display portion, wherein the body defines a longitudinal channel extending through the lower base and the upper display portion;
a clamp coupled to the body, the clamp being configured to retain the jewelry in a fixed position relative to the body, the clamp having at least one portion movable relative to the body and configured for selective movement between a closed position and an open position, the at least one portion resiliently biased into the closed position, wherein the at least one movable portion is a hook having a bent portion extending above the upper display portion of the body and having an elongated portion that extends in the longitudinal channel and that is configured for relative translation with the body in the longitudinal channel;
a first grip secured to an upper surface of the upper display portion;
a second grip secured to the bent portion of the hook, the first and second grips having respective first and second grip surfaces that are oppositely facing and parallel, the first and second grip surfaces configured to grip the jewelry disposed therebetween;
a resilient biasing member between the hook and the body, the resilient biasing member configured to urge the first and second grips toward one another; and
a washer in the longitudinal channel, the washer secured to the elongated portion of the hook in the longitudinal channel, wherein the washer and the longitudinal channel are configured to permit relative translation therebetween without relative rotation;
a lever pivotally connected to the body and having a first end engaged with the hook and having a second end extending from the body, the second end configured to be depressed by a user to pivot the lever to cause the first end of the lever to translate the hook to open the clamp.

15. The apparatus according to claim 14, wherein:
the washer has a substantially circular central region and has a plurality of projections extending radially from an outer periphery of the substantially circular region, and wherein the longitudinal channel has a cross sectional shape that mates with and is complementary to the shape of the washer.

16. The apparatus of claim 14, wherein:
wherein the body defines a spring seat in the longitudinal channel, and
wherein the at least one portion is resiliently biased into the closed position by a spring,
and wherein the spring is disposed between the spring seat and the washer in the longitudinal channel.

* * * * *